Patented Feb. 17, 1953

2,628,954

UNITED STATES PATENT OFFICE 2,628,954

COPOLYMERS OF VINYLIDENE CYANIDE WITH ACRYLONITRILE

Harry Gilbert, Cuyahoga Falls, Ohio, assignor to The B. F. Goodrich Company, New York, N. Y., a corporation of New York No Drawing. Application January 24, 1950, Serial No. 140,356

5 Claims. (Cl. 260—78.5)

This invention relates to the preparation of novel copolymers of vinylidene cyanide with acrylonitrile (vinyl cyanide), which copolymers are useful resinuous materials, being especially valuable in the preparation of filaments and films.

In U. S. Patent 2,476,270, to Alan E. Ardis, and in copending applications, Serial No. 63,434, filed December 3, 1948, now U. S. Patent 2,502,412 and Serial No. 79,712, filed March 4, 1949, now U. S. Patent 2,514,387 novel methods for the preparation of monomeric vinylidene cyanide (also called 1,1-dicyano ethylene) are disclosed. In another copending application, Serial No. 11,336, filed February 26, 1948, methods for the preparation of useful homopolymers of vinylidene cyanide are disclosed.

Monomeric vinylidene cyanide is a clear liquid at room temperature and a crystalline solid at 0° C. It melts in the range of 6° C. to 9.7° C., depending on purity, with purest samples melting at 9.0° C. to 9.7° C. and it boils at 40° C. at a reduced pressure of 5 mm. of mercury. It is quite unstable because of its extreme sensitivity to water, undergoing on contact with water at room temperature an instantaneous homopolymerization reaction to give a solid, water-insoluble resin. When it is allowed to stand at room temperature in admixture with butadiene-1,3, it reacts therewith in the Diels-Alder reaction to give solid 4,4-dicyanocyclohexene.

It has now been discovered that when monomeric vinylidene cyanide of the above physical and chemical characteristics is copolymerized with acrylonitrile in the presence of a free radical polymerization catalyst, new and useful copolymers are obtained regardless of the respective quantities of vinylidene cyanide and acrylonitrile in the polymerization mixture.

The copolymerization of vinylidene cyanide with acrylonitrile may be carried out in a number of different ways. One preferred method consists in first dissolving the vinylidene cyanide and the acrylonitrile in an aromatic hydrocarbon or chlorinated aromatic hydrocarbon solvent such as benzene, toluene, methyl toluenes, trichloro benzene, or the like, preferably free from impurities which initiate the ionic polymerization of the monomer, and in an amount such that the solvent comprises approximately 30 to 80% by weight of the total solution. A polymerization catalyst is included in this solution and the resulting mixture is heated to a temperature of about 20° C. to 80° C., whereupon polymerization occurs to form the desired copolymer as a white powder of small particle size. The copolymer thus formed is insoluble in the aromatic solvent and accordingly may be readily recovered from the polymerization mixture simply by filtering.

A second method of polymerization consists in agitating the monomers in a liquid aliphatic hydrocarbon (such hydrocarbons being non-solvents for vinylidene cyanide), for example, hexane or heptane, in the presence of a polymerization catalyst, whereupon the copolymer forms and may be recovered from the polymerization mixture by filtering. It is important when using this method of polymerization that the liquid aliphatic hydrocarbon be free from impurities which initiate the ionic polymerization of vinylidene cyanide.

Alternatively, the polymerization may be carried out without the use of a solvent or other liquid medium for the monomers, that is, simply by heating and agitating a mixture of the monomers either with or without a polymerization catalyst. Also, the polymerization may be effected at temperatures as low as 0° C. or lower or as high as 100° C. or even higher, polymerization being more rapid at any temperature in the presence of a catalyst.

It is to be understood, of course, that regardless of the polymerization method utilized, the polymerization should be stopped before either of the monomers is entirely consumed, in order that an essentially pure copolymer will be obtained. Otherwise, when either of the monomers is completely used up, the product will contain straight polymer obtained by polymerization of the remaining monomer. Accordingly, it is often desirable to add, continuously or intermittently, fresh quantities of one or both of the monomers, and also of catalyst and solvent, if desired, to the polymerization mixture during the course of the polymerization, thus taking fullest advantage of the capacity of the equipment and in effect operating a continuous or semi-continuous process.

The catalyst, if any, which is used in the polymerization process is preferably a peroxygen compound such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, tetralin peroxide, or the like. In general from 0.01 to 2.0% by weight of the catalyst (based on the total weight of the monomers charged) is utilized, although smaller or larger amounts may be employed if desired. By regulating the amount of the catalyst it is possible to control very readily and accurately the molecular weight of the copolymer. For instance, to obtain a high-molecular weight copolymer, a small quantity of catalyst is used, while lower-molecular weight copolymers are obtained by the use of large amounts of catalyst.

The following examples illustrate the preparation of copolymers of vinylidene cyanide and acrylonitrile in accordance with this invention, but are not to be construed as a limitation upon the scope thereof, for there are, of course, numerous possible variations and modifications. In the examples all parts are by weight.

Examples I to IV

A series of vinylidene cyanide:acrylonitrile copolymers is prepared by dissolving the two monomers in benzene, adding o,o'-dichlorobenzoyl peroxide as the polymerization catalyst and heating the resulting solution to about 40° C. whereupon polymerization occurs to form a resinous copolymer which precipitates from the benzene solution and is recovered by filtering. The charging rates of the monomers and catalyst, parts benzene, time during which the polymerization is continued, conversion, and the mole percent of vinylidene cyanide in the copolymer are recorded in the following table:

| Example | I | II | III | IV |
|---|---|---|---|---|
| Parts Benzene | 21.2 | 11.5 | 10.0 | 9.6 |
| Parts Vinylidene Cyanide | 0.99 | 1.49 | 1.98 | 2.48 |
| Mole Percent Vinylidene Cyanide | 10.0 | 30.0 | 50.0 | 70.0 |
| Parts Acrylonitrile | 6.06 | 2.36 | 1.35 | 0.72 |
| Mole Percent Acrylonitrile | 90.0 | 70.0 | 50.0 | 30.0 |
| Parts Catalyst | 0.007 | 0.004 | 0.003 | 0.003 |
| Mole Percent Vinylidene Cyanide in Copolymer | 10.2 | 38.6 | 28.9 | 29.2 |
| Conversion (percent) | 2.0 | 10.4 | 3.9 | 2.0 |
| Polymerization Time (hours) | 19.7 | 114.0 | 114.0 | 114.0 |

When the above examples are repeated in the absence of benzene, that is, simply by mixing the two monomers and the catalyst together and then heating the resulting mixture, excellent copolymers are again obtained. Likewise, when the polymerization is carried out utilizing other of the peroxygen catalysts disclosed hereinabove or no catalyst at all, or at temperatures as low as 0° C. or as high as 100° C., or with charging ratios as low as 1 mole percent or as high as 95 mole percent vinylidene cyanide, resinous materials are again obtained containing copolymerized vinylidene cyanide and acrylonitrile and differing in properties from straight polymers of either of the two monomers.

The copolymers of vinylidene cyanide with acrylonitrile obtained by the polymerization methods disclosed herein are in general hard, infusible materials, insoluble in most organic solvents including acetone, methyl ethyl ketone, cyclohexanone, formic and acetic acid, alcohols, ethers, phenols, benzene, chlorobenzene, etc. However, they are characterized by being soluble in dimethyl formamide and tetramethylene sulfone, and solutions of the copolymers in these solvents are well adapted for use in the spinning of filaments or the casting of films, such filaments and films having many advantageous properties, including flexibility, toughness, and resistance to the action of a great many chemicals. The properties of filaments prepared from vinylidene cyanide:acrylonitrile copolymers are superior to those of filaments prepared from straight polymers of either vinylidene cyanide or acrylonitrile and can be further improved by a "hot-stretching" process, a process whereby the filament is stretched in a hot zone in a series of steps, a procedure disclosed in a copending application, Serial No. 113,018, filed August 29, 1949.

Although specific examples of the invention have been herein described, it is not intended to limit the invention solely thereto, but to include all of the variations and modifications falling within the spirit and scope of the appended claims.

I claim:

1. A copolymer of vinylidene cyanide and acrylonitrile, in which copolymer the vinylidene cyanide units are derived from the monomeric vinylidene cyanide which is a liquid at room temperature and a crystalline solid at 0° C., having a melting point when in purest form, of substantially 9.0° C. to 9.7° C., and is characterizable chemically by the ability to undergo on contact with water at room temperature an instantaneous homopolymerization reaction to give a solid, water-insoluble resin and by the ability to react with butadiene-1,3, when admixed therewith at room temperature, to give solid 4,4-dicyano cyclohexene.

2. The method which comprises preparing a solution containing monomeric vinylidene cyanide, monomeric acrylonitrile, a peroxide polymerization catalyst and a solvent selected from the class consisting of aromatic hydrocarbons and chlorinated aromatic hydrocarbons, the monomeric vinylidene cyanide present in said solution being a liquid at room temperature and a crystalline solid at 0° C. having a melting point, when in purest form, of substantially 9.0 to 9.7° C. and being characterizable chemically by the ability to undergo on contact with water at room temperature an instantaneous homopolymerization reaction to give a solid water-insoluble resin and by the ability to react with butadiene-1,3, when admixed therewith at room temperature, to give solid 4,4-dicyano cyclohexene, and maintaining the said solution at a temperature of 20 to 80° C. for a time sufficient to effect a copolymerization of the said vinylidene cyanide and acrylonitrile and precipitation of a solid resinous copolymer of vinylidene cyanide and acrylonitrile from the said solution.

3. The method of claim 2 in which the solvent comprises 30 to 80% by weight of the solution and the peroxide catalyst is present in an amount from 0.01 to 2.0% by weight based on the total amount of monomeric vinylidene cyanide and monomeric acrylonitrile.

4. The method of claim 3 further characterized in that the solution contains from 1 to 7 moles of monomeric vinylidene cyanide for each 3 to 9 moles of monomeric acrylonitrile.

5. The method of claim 4 further characterized in that the solvent is benzene and the peroxide catalyst is o,o'-dichlorobenzoyl peroxide.

HARRY GILBERT.

REFERENCES CITED

The following references are of record in the file of this patent:

UNITED STATES PATENTS

| Number | Name | Date |
|---|---|---|
| 2,466,395 | Dickey | Apr. 5, 1949 |